O. W. PATTON.
HOSE BAND.
APPLICATION FILED OCT. 27, 1915.
1,230,019.
Patented June 12, 1917.
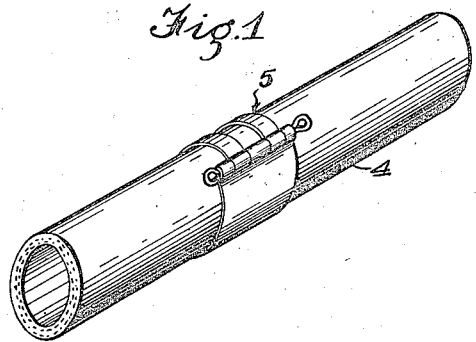
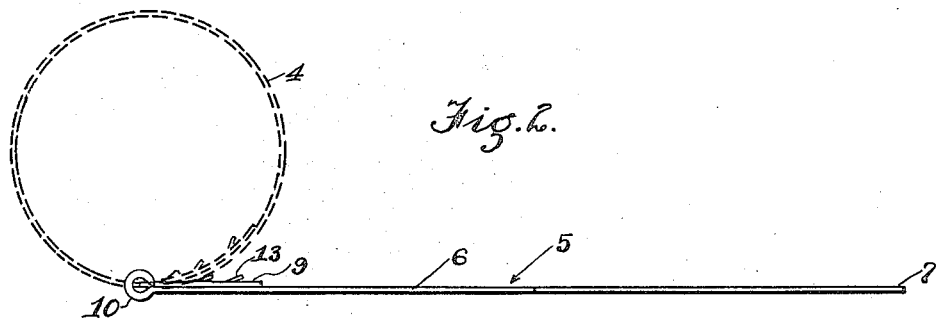
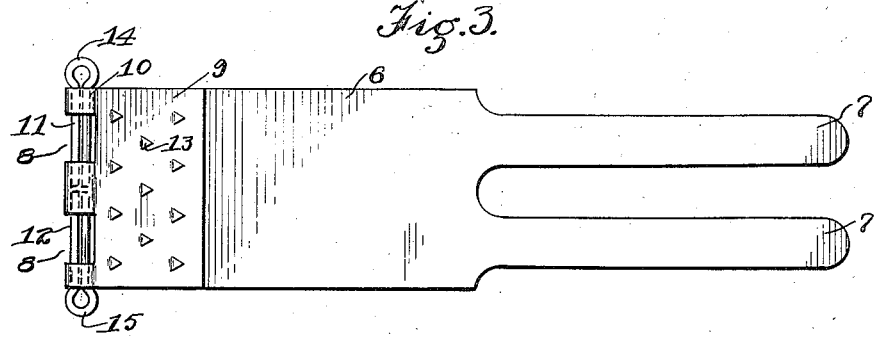
Inventor.
Orvie W. Patton.
By Edmund A. Strause
Atty.

UNITED STATES PATENT OFFICE.

ORVIE W. PATTON, OF LOS ANGELES, CALIFORNIA.

HOSE-BAND.

1,230,019.　　　　　　Specification of Letters Patent.　　Patented June 12, 1917.

Application filed October 27, 1915. Serial No. 58,131.

*To all whom it may concern:*

Be it known that I, ORVIE W. PATTON, a citizen of the United States, residing at Los Angeles, in the county of Los Angeles and State of California, have invented new and useful Improvements in Hose-Bands, of which the following is a specification.

This invention relates to a hose band, and especially to a band adapted to stop leaks.

It is an object of this invention to provide a hose band which may be secured to any portion of a hose without the aid of tools.

It is another object of this invention to provide a hose band with means which engages the hose and prevents the band from being displaced while it is being secured to the hose, and assists in preventing displacement after it has been installed on the hose.

It is a further object of this invention to provide a hose band which may be formed from a sheet of metal, and requires merely a pin provided with a slot, for securing the band to the hose.

I accomplish these objects by means of the embodiment of my invention illustrated in the accompanying drawing, in which:

Figure 1 is a perspective view of a fragment of a hose with my improved band attached thereto.

Fig. 2 is an elevation of the band with a hose shown in dotted lines illustrating the relative positions of the band as it is being installed upon the hose.

Fig. 3 is a plan view of the band.

Referring more particularly to the drawing, 4 indicates a hose of the usual flexible type, and 5 the band. The band 5 comprises a plate 6 provided with one or more tongues 7 which extend parallel with the length of the plate. I have herein illustrated the plate as having two tongues. Rectangular apertures 8 are disposed adjacent the end of the plate opposite to the tongues 7, and the end of the plate is bent backward upon itself, as indicated at 9. A bight 10 is formed at the portion where the slots 8 are disposed, and is so constructed that a bearing is formed for pins 11 and 12. Spurs 13 are provided upon the portion 9 and may be formed by punching up portions of the metal. If desired, spurs may be formed on other portions of the plate.

Pins 11 and 12 are cotter pins having eyes 14 and 15 which may be engaged by some instrument to turn the pins, such as a nail. Plate 6 is formed of a flexible material such as galvanized iron. The plate may be stamped or punched and then bent into the form shown in Figs. 2 and 3, thereby providing a structure which can be manufactured very cheaply.

To install my improved hose band, the hose 4 and band 5 are disposed in the position shown in Fig. 2 with the bight 10 against the hose. The plate is then bent around the hose, the spurs 13 engaging the hose, and maintaining the band in position. Cotter pins 14 and 15 are inserted in the bight 10 and tongues 7 disposed in the slots formed in the cotter pin. A nail or other pin is then inserted in the eyes 14 and 15 of the cotter pins, and the pins turned winding the tongues 7 upon the pins and tightening the band against the hose. As the pins are turned and the tongues 7 are wound upon them, the inner edge of the bight will approach said tongues until it frictionally engages them, thereby holding the tongues firmly in their wound positions.

It is obvious that my band may be used for various purposes, thus if the hose is to be mended for a leak, the plate 6 is disposed so that it covers the leak. The rubber tips on metallic gas hose may also be closed by the use of my improved band. Couplings which have been inserted in sections of hose may be secured thereto by placing my band around the hose at the juncture of the sections. Spurs 13 are an important feature of my invention, as they maintain the hose band in place and prevent it from turning on the hose when being installed. The provision of apertures 8 instead of slots which extend to the edge of the plate add strength as a large bearing surface is provided, thereby preventing the end 9 from slipping.

What I claim is:

1. A hose band, consisting of a plate, said plate having relatively long tongues at one end and bearings for rotatable pins at the other end, spurs on said plate arranged for engaging the hose, and independent rotatable pins disposed in said bearings one for each tongue, each pin provided with an eye at its end and having means for engaging the tongue.

2. A hose band, comprising a band adapted to encircle a hose, said band having a tongue at one end, the other end thereof bent under upon itself to form a bight, a slot in said band at the bight, said slot arranged to receive said tongue, spurs on the bent over portion of said band arranged for engaging the hose, and a rotatable pin disposed in said bight, said pin provided with means for engaging said tongue and having an eye at its end so that upon rolling said tongue upon said bight the inner edge of said slot will be moved into frictional engagement with said tongue.

3. A hose band, comprising a plate, said plate having a plurality of tongues at one end, the other end thereof bent upon itself to form a bight, a plurality of apertures in said plate at the bight arranged to receive said tongues, spurs on said plate arranged for engaging a hose, and independent rotatable pins disposed in said bight, each pin provided with means for engaging one of said tongues.

4. A hose band, comprising a plate, said plate having a plurality of tongues at one end, the other end thereof bent upon itself to form a bight, a plurality of apertures in said plate at said bight arranged to receive said tongues, spurs on the bent portion of said plate arranged for engaging the hose, and independent rotatable pins disposed in said bight, each pin provided with means for engaging one of said tongues.

In witness that I claim the foregoing I have hereunto subscribed my name this 5th day of October, 1915.

ORVIE W. PATTON.